(12) United States Patent
Gerde et al.

(10) Patent No.: US 7,634,651 B1
(45) Date of Patent: Dec. 15, 2009

(54) SECURE DATA TRANSMISSION WEB SERVICE

(75) Inventors: Matthew E. Gerde, The Colony, TX (US); Jonathan M. Talan, Frisco, TX (US); Raul Quintanilla, Frisco, TX (US); Albert L. Babovec, Jr., Garland, TX (US)

(73) Assignee: Intuit Inc., Mountain View, CA (US)

( * ) Notice: Subject to any disclaimer, the term of this patent is extended or adjusted under 35 U.S.C. 154(b) by 768 days.

(21) Appl. No.: 11/256,029

(22) Filed: Oct. 21, 2005

(51) Int. Cl.
*H04L 29/06* (2006.01)

(52) U.S. Cl. .................................. 713/153; 713/170
(58) Field of Classification Search ............ 713/153
See application file for complete search history.

(56) References Cited

U.S. PATENT DOCUMENTS 7,457,954 B2 * 11/2008 Wakiyama ................. 713/170

* cited by examiner

*Primary Examiner*—Gilberto Barron, Jr.
*Assistant Examiner*—Abdulhakim Nobahar
(74) *Attorney, Agent, or Firm*—Osha • Liang LLP

(57) ABSTRACT

A web service includes a web service manager for servicing an originating message received from an originating client application, wherein the originating message has verification information a data package having an encrypted portion. The web service manager verifies that the originating message originated from an authorized originating client application, using the verification information. An identifier generator creates a data package identifier associated with the data package and a location within a data package store used for storing the data package. A message generator generates a notification message which is sent to a receiving computing system. Upon receipt of at least a portion of the notification message from the receiving computing system, the web service manager retrieves the data package from the data package store and initiates transfer the data package to the receiving computing system.

19 Claims, 7 Drawing Sheets

SECURE DATA TRANSMISSION WEB SERVICE

BACKGROUND

Many businesses require secure transmission of data between themselves and clients or customers. For example, a tax preparer may need to deliver data (e.g. tax return information) to a taxpayer for review. Additionally, the taxpayer may need to edit the data and to transmit the corrected data back to the tax preparer.

Transmission of information between users can be accomplished using different forms of electronic communication. Examples of common forms of electronic communication and messaging include electronic mail (email), peer-to-peer messaging services, and web services.

A web service is a software system designed to support machine-to-machine interaction over a network. One way to use a web service to transmit information between a first user and a second user is for the first user to transmit the information to the web service, and for the web service, in turn, to send the information to the second user in an email. The information delivered to the second user may contain raw data, executable software applications, etc.

Delivering an executable software application to a user within an email may be difficult to accomplish because many email systems filter out email that contains anything executable (for virus protection reasons, and for other reasons) or emails that exceed a predetermined size limitation. It may be possible to avoid the size limitation issue by sending the user a smaller executable having a primary purpose of allowing the user to download and install the full client software application. However, trying to send a smaller application executable does not eliminate the problem of executables being filtered out by email systems.

Data sent by tax preparers to their clients is often sensitive, thus requiring additional security to ensure that the data is only readable by the intended recipient. To provide the desired security, data is often encrypted prior to transmission.

Encryption is the manipulation of data to prevent access to the data by unauthorized individuals. To read encrypted data, a user typically must have a key or password that enables decryption of the data. Often encryption involves the use of a pair of keys including a public key and private key combination. The public key may be as widely published as the owner desires and the private key is known by the sender of the encrypted data and the intended recipient of the encrypted data. Such decryption generally takes place with a client application having functionality such as an encryption algorithm for encrypting and decrypting the data.

SUMMARY

A web service is described, having a web service manager for servicing an originating message received from an originating client application. The originating message comprises a data package at least a portion of which is encrypted, and verification information. The web service manager verifies that the originating message originated from an authorized originating client application using the verification information.

The web service has an identifier generator for creating a data package identifier associated with the data package, and a data package store for storing the data package. Further, a message generator is provided to generate a notification message which is to a receiving computing system to notify a user of that receiving computing system that a data package awaits delivery. Upon receipt of at least a portion of the notification message from the receiving computing system, the web service manager retrieves the data package from the data package store and initiates transfer of the data package to the receiving computing system.

A method for managing the transmission of a data package is described, and includes receiving an originating message, and verifying the originating message as originating from an authorized originating client application. A data package, at least a portion of which is encrypted, is extracted from the originating message and stored in a data package store. A data package identifier is generated, the identifier being associated with a location within the data package store where the data package is stored.

Further, a notification message is generated which includes at least a portion of the data package identifier, and that notification message is sent to a receiving address associated with a receiving user. At some time later, a request is sent back, the request including at least a portion of the notification message. After receiving the request, the data package is retrieved from the data package store using the portion of the notification message, and transfer of the data package to the receiving computing system is initiated.

A method for managing the exchange of information includes receiving a first message including a Uniform Resource Locator from a first source, and transmitting a second message to the first source with at least a first portion of the Uniform Resource Locator wherein the first portion of the Uniform Resource Locator is obfuscated. The method for the exchange of information includes receiving a stub application and a data package with an encrypted portion and displaying the data package using the stub application which is responsive to receiving valid authentication information.

Other aspects of the invention will be apparent from the following description and the appended claims.

DETAILED DESCRIPTION

Figure 1:
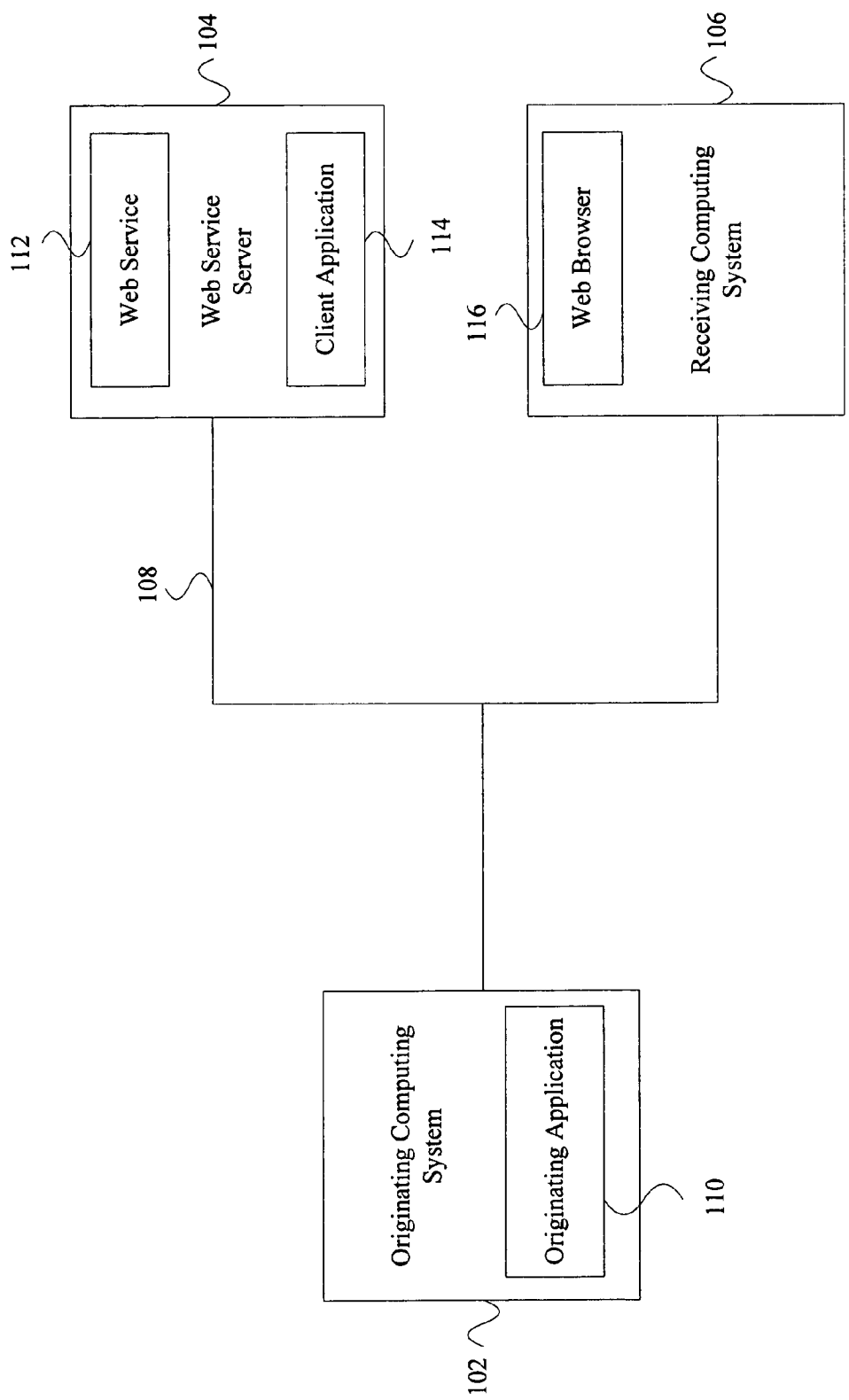
FIGS. 1-4 show block diagrams in accordance with one or more embodiments of the invention.

Exemplary embodiments of the invention will be described with reference to the accompanying drawings. Like elements in the various figures are denoted by like reference numerals for consistency.

In the following detailed description of the invention, numerous specific details are set forth in order to provide a more thorough understanding of the invention. In other instances, well-known features have not been described in detail to avoid overcomplicating this disclosure.

In this specification, it is intended that the term "coupled" describe devices which interact with each other, either directly or indirectly. For example, first and second devices that interact with each other through a transmission line between the two devices are directly coupled. Further, first and second devices that have intermediate devices disposed between them, and interact with one another through those intermediate devices, are indirectly coupled. In both situations, the first and second devices are considered coupled.

In this specification, the term 'portion' is used to denote any part of something, up to and including the whole.

In general, in one or more embodiments, the present invention relates to securely transmitting a data package between an originating computing system and a receiving computing system, using an intermediary computing system, such as a web service or other intermediary. The data package includes encrypted data that the originating client user would like the receiving client user to receive, review and edit, as necessary, together with optional additional information.

The data package may be transmitted by the originating computing system without any accompanying information or software applications, or may alternatively be accompanied with a stub application optionally having functionality enabling the decryption and review of portions of the data package, as desired. The stub application may further be configured to facilitate the download of a client application having a richer feature set. In one or more embodiments, the receiving client application includes functionality enabling the encryption and decryption of data, and editing of data, as needed, in addition to having functionality enabling the transmission and receipt of data and other client applications.

In one or more embodiments of the invention, the stub application is provided by the originating computing system as a portion of the data package when the data package is transmitted to the web service. In one or more embodiments of the invention, the stub application is not sent with the data package by the originating computing system, but is instead separately provided by a web service server or other computing system at any time.

It is not necessary that the transmission of the data package to a user of a receiving computing system take place in any particular time frame with respect to the time that the data package arrived at the web service server. In one or more embodiments of the invention, the data package is transmitted by the originating computing system to the web service server, and a stub application is provided with the data package, by the web service to the receiving computing system, at anytime before, during or after receipt of the data package by the web service server.

At some time following receipt of the data package and other optional information by the web service server, a notification message is prepared by the web service and is sent to the receiving computing system to notify a user of that receiving computing system that there is a data package at the web service server awaiting delivery.

The notification message may include, but is not limited to, information relating to the originator of the data package, the location of the data package within the web service server, if applicable, and other information deemed beneficial by the system designers. In one or more embodiments of the invention, the notification message contains a uniform resource locator (URL) facilitating the retrieval of the data package and the stub application from one or more specific locations within a database or other data store coupled to the web service server. In one embodiment of the invention, the URL contains a domain name together with obfuscated location information the web service uses to retrieve the data package from the data store.

When a receiving user receives the notification message, that receiving user may enter the URL into a web browser to request transfer of the data package and stub application, as needed. When the web service receives the URL containing the obfuscated information, that obfuscated information is decoded by the web service server. The decoded information points to a location within the data store where the data package is located. The web service server then retrieves the data package stored at that location.

Once the one or more files are retrieved from the location determined by the decoded information, a file transfer process is initiated by the web service server, to transfer the data package and the stub application to the receiving user. Once the receiving user receives the stub application and the data package, the receiving user may optionally use the stub application to initiate transfer of a client application having a richer feature set.

The stub application optionally includes functionality facilitating encryption and decryption of an encrypted portion of the data package, as well as allowing the receiving user to review one or more portions of the data package, such as the encrypted portion, as desired. Optionally, the client application is configured to perform one or more of facilitating review of the data, editing of the data, encryption of the data, and transmission of the data back to the originating computing system through the web service server.

FIG. 1 shows a block diagram in accordance with one or more embodiments of the invention. An originating computing system (102), a web service server (104), and a receiving computing system (106) are coupled to each other through transmission lines (108). The originating computing system (102) optionally includes an originating application (110) which has functionality to create, encrypt, decrypt, and edit one or more portions of a data package, as desired. The receiving computing system (106) includes at least one software application such as a web browser (116) having functionality enabling the viewing and optional exchange of information at a network location (such as that which may be specified by a URL, or otherwise) and for receiving file transfers.

In one or more embodiments of the invention the originating computing system (102), the web service server (104), and the receiving client system (106) are coupled to each other through a network such as the Internet, a local area network, a wide area network, a combination of different networks, or other computer communication systems enabling electronic communication of data. Additionally, such communication may take place over wired networks and systems, or may alternatively take place using wireless communication.

The web service server (104) includes functionality such as a web service (112) to receive information from an originating client application (110), store that information, and to notify a receiving user of the arrival of information destined for that receiving user. Further, the web service (112) may include a client application (114) that facilitates the encryption and decryption of information such as a data package, and a stub application facilitating the download of the client application.

Figure 2:
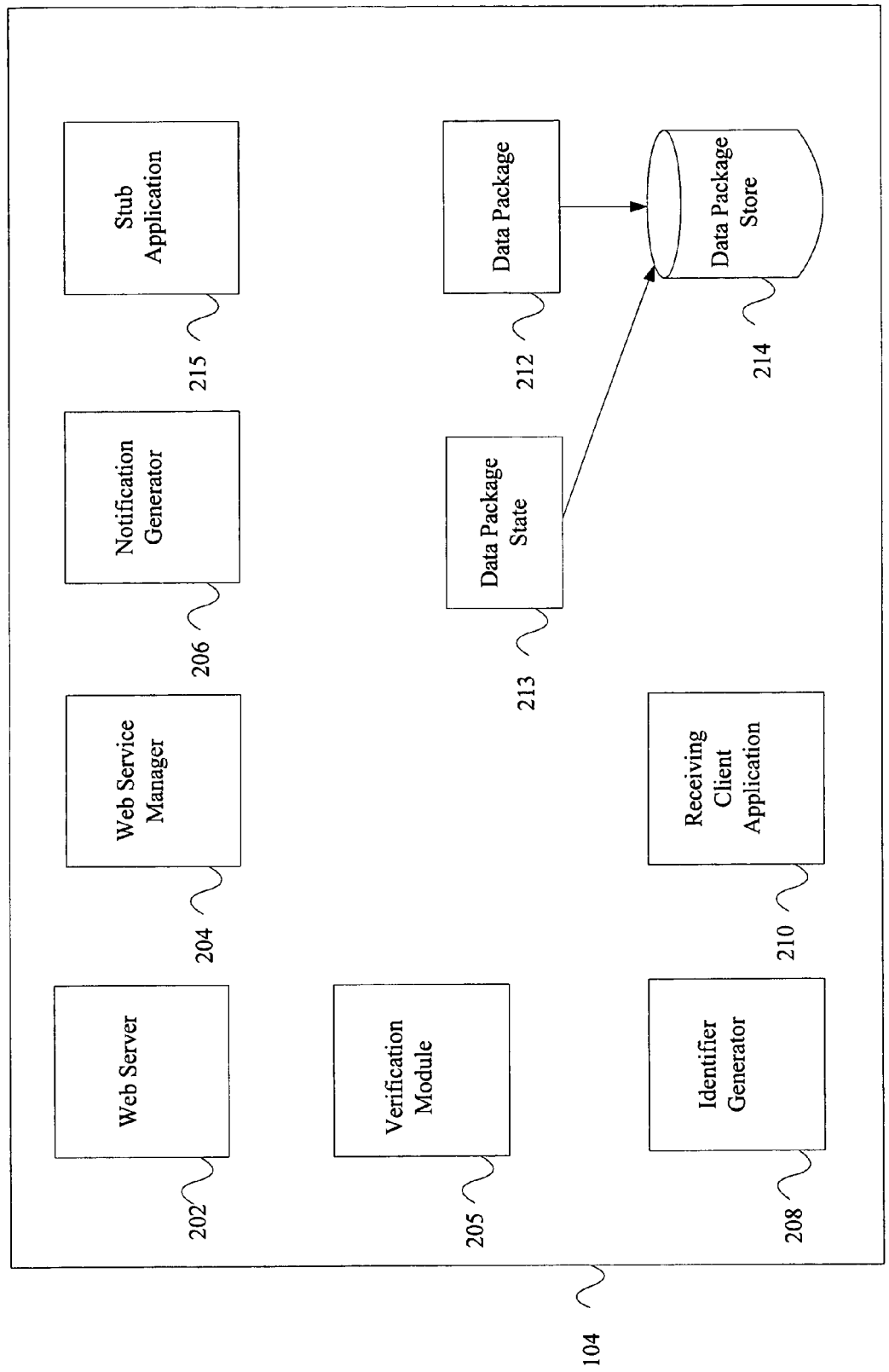

The web service server (104) performs many functions, and will be discussed below in greater detail. FIG. 2 shows a block diagram of a web server according to one or more embodiments of the invention.

In order to facilitate the exchange of information between an originating computing system (102 of FIG. 1) and a receiving computing system (106 of FIG. 1) using a web service, modules such as a web server (202), a web service manager (204), verification module (205), a notification generator (206), and an identifier generator (208) are employed as needed. Although discussed herein as discrete modules, functionality discussed herein as pertaining to one or more of these modules may be combined and recombined to be in any number of modules, a single module, etc., as desired by system designers.

Also available to, or stored within web service server (104) are a receiving client application (210), and a data package (212) received from an originating user. The data package (212) optionally includes a data package state (213) and is stored within a data package store (214) at an appropriate time following receipt. A data package state includes information regarding whether the data package (212) has been provided to the receiving computing system (102).

In one embodiment, a web server (202) receives and transmits information using the HyperText Transfer Protocol Secured (HTTPS). Other protocols and methodologies such as HTTP may also be used to communicate with the web service server (104 of FIG. 1) as needed. As an example, the web server (202) may be configured to communicate using one or more of peer-to-peer file transfers, email transfers, and other types of transfers desired by system designers. Persons of ordinary skill in the art having the benefit of this disclosure will readily recognize that many different protocols may be acceptable for transmitting various information between one or more computing systems discussed in this disclosure.

Those skilled persons will readily recognize that protocols and formats used to exchange information between a first computing system and a second computing system may not be the same protocols and formats as used to transmit the same information between the second computing system and a third computing system.

In one example, when a message is received from the originating computing system (102 of FIG. 1), at least a portion of the message is initially received and processed by the web server (202). The received message includes one or more data packages (212) to be delivered to a designated third party.

This data package (212) contains data, a portion of which is encrypted, to be transmitted to the receiving computing system (106 of FIG. 1). In one or more embodiments, the data package (212) is associated with a data package state (213) indicating a current state of the transmission of the data package (212) (i.e. whether the data package (212) has been transmitted to a receiving computing system (106)).

For example, if the data package state (213) indicates that the data package (212) has not yet been transmitted to the receiving computer system (104), the web service manager (204) optionally allows the originating user to update or replace the data package (212) with a new data package (not shown) prior to transmission to the receiving computer system (106), if needed. However, if the data package state (213) indicates that the data package (212) has previously been transmitted to the receiving computing system (106), the web service manager (204) optionally prevents any modifications to be made to the data package (212).

The web server (202) notifies the web service manager (204) of the receipt of the originating message, so the web service manager (204) may initiate one or more processes related to receiving the communication, as needed. As an example, the web service manager (204) passes a portion of the originating message containing verification information to the verification module (205) to verify or authenticate that the originating message came from a client application authorized to use the web service.

In one or more embodiments, verification includes a handshake negotiation between the originating client application and the web service verification module (205) wherein a software signature code is transmitted from the originating client application which identifies it as an authorized source. In another example, prior to transmitting the information, the data package (212) is optionally "signed" using a client identifier (e.g. verification information). The verification information is used by the verification module (205) to verify that the received message came from an authorized source.

After verification completes successfully, the web service manager (204) extracts the data package (212) from the received message, and stores it in the data package store (214). In one embodiment of the invention, the data package store (214) is a relational database. In one embodiment of the invention, the data package store (214) is a conventional file system. Persons of ordinary skill in the art having the benefit of this disclosure will readily be aware of other forms of storage locations that may be used to implement the invention.

At some time after the received message is received from the originating computing system (102 of FIG. 1), the web service manager (204) causes the notification generator (206) to prepare a notification message for the receiving computing system (106 of FIG. 1). The notification message may include, but is not limited to, information associated with the retrieval of the data package (212) from the data package store (214) such as the domain name where contact with the database may be made, obfuscated file location information, a unique identifier, etc.

An identifier generator (208) facilitates creation of an identifier that is unique to this particular data package and which helps the database, when this identifier is presented at a later time, locate the proper data package (212) within the data package store (214). In one or more embodiments of the invention, the identifier generator (208) uses a hash function which accepts a string of characters as input (e.g. a filename, a file location, a date stamp, etc.) and produces an encrypted string, typically called a hash, as output that is unique to the data package (212). This hash may be one way, and is unique within the web service server (104). This hash may be associated, in a lookup table, for example, with the location of the data package (212).

Following transmission of the notification message previously prepared by the notification generator (206) notifying the receiving computing system (106 of FIG. 1) that a received message is waiting at the web service server (104 of FIG. 1), a receiving user may cause the web service server (104) to initiate transmission of the data package (212) to the receiving computing system (106 of FIG. 1), by clicking on a URL within the notification message, or by other means. The URL, if used, includes one or more of the domain name of the web service server (104 of FIG. 1) together with information (such as the hash previously described) pointing to where the data package (212) is stored within the data package store (214).

The web service manager (204) then retrieves the data package (212) associated with the data package identifier to deliver to the receiving user.

The web service server (104 of FIG. 1) optionally has stored thereon a stub application (215) which provides functionality such as delivering a receiving client application (210) to a user. Such a stub application (215) may be transmitted independent of the data package (212) by the web server (104 of FIG. 1) to the receiving computing system (106 of FIG. 1), or may instead be provided to the receiving computing system (106 of FIG. 1) at approximately the same time as when the data package (212) is provided. Further, the stub application (215) may either be resident on the web service server (104 of FIG. 1), or may instead be provided by the originating computing system (102 of FIG. 1), as desired by system designers.

After the stub application (215) is received at the receiving computing system (106 of FIG. 1), the stub application (215) is executed, providing functionality to initiate the download of the receiving client application (210) from the web service server (104 of FIG. 1), as desired. The receiving client application (210) is intended to have an overlapping but richer feature set than the feature set of the stub application (215), and provides functionality not limited to enabling one or more of decryption of the data package upon entry of valid authentication information, review and editing of data contained within that data package, encryption of the edited data, and transmission of that edited data package back to the originating computing system (102 of FIG. 1) as needed.

Figure 3:
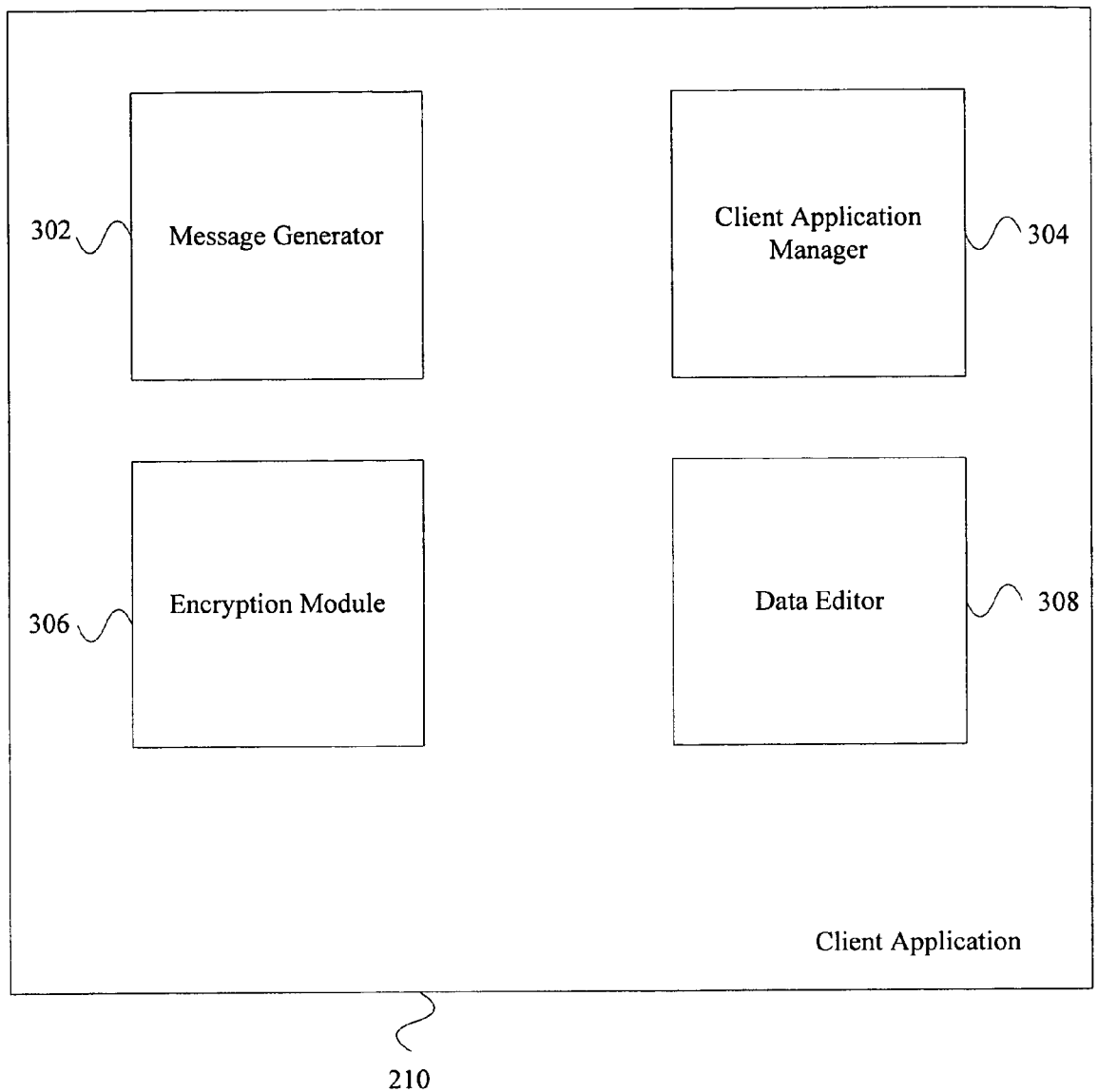

FIG. 3 shows a block diagram in accordance with one or more embodiments of the present invention. In one embodiment of the invention, the receiving client application (210) includes a message generator (302) with the ability to exchange one or more types of electronic communication with the web service server (104 of FIG. 1).

Such electronic communication may include one or more of an HTTP request, an HTTPS request, an XML message, a peer-to-peer message, an email message, etc. Optionally, the contents of the electronic communication are encoded using an encoding scheme (e.g. a base 64 encoding scheme). Persons of ordinary skill in the art will appreciate that an electronic communication can be in many different forms and be sent using many different protocols while remaining within the scope and purpose of the invention.

In one embodiment, the receiving client application (210) has a client application manager (304) for managing the encryption and decryption of the data package (212 of FIG. 2) using an encryption module (306). The encryption module (306) relies on an encryption algorithm (e.g. Blowfish, or any other suitable algorithm) to encrypt and decrypt the data. In one embodiment of the invention, the receiving client application (300) has a data editor (308) (e.g. a text editor) for reviewing or modifying decrypted user data, as needed.

The invention may be used to send and receive different types of files encrypted or not. In some circumstances, it may be desirable to encrypt a portion of a transmitted file or message, rather than its entirety.

Figure 4:
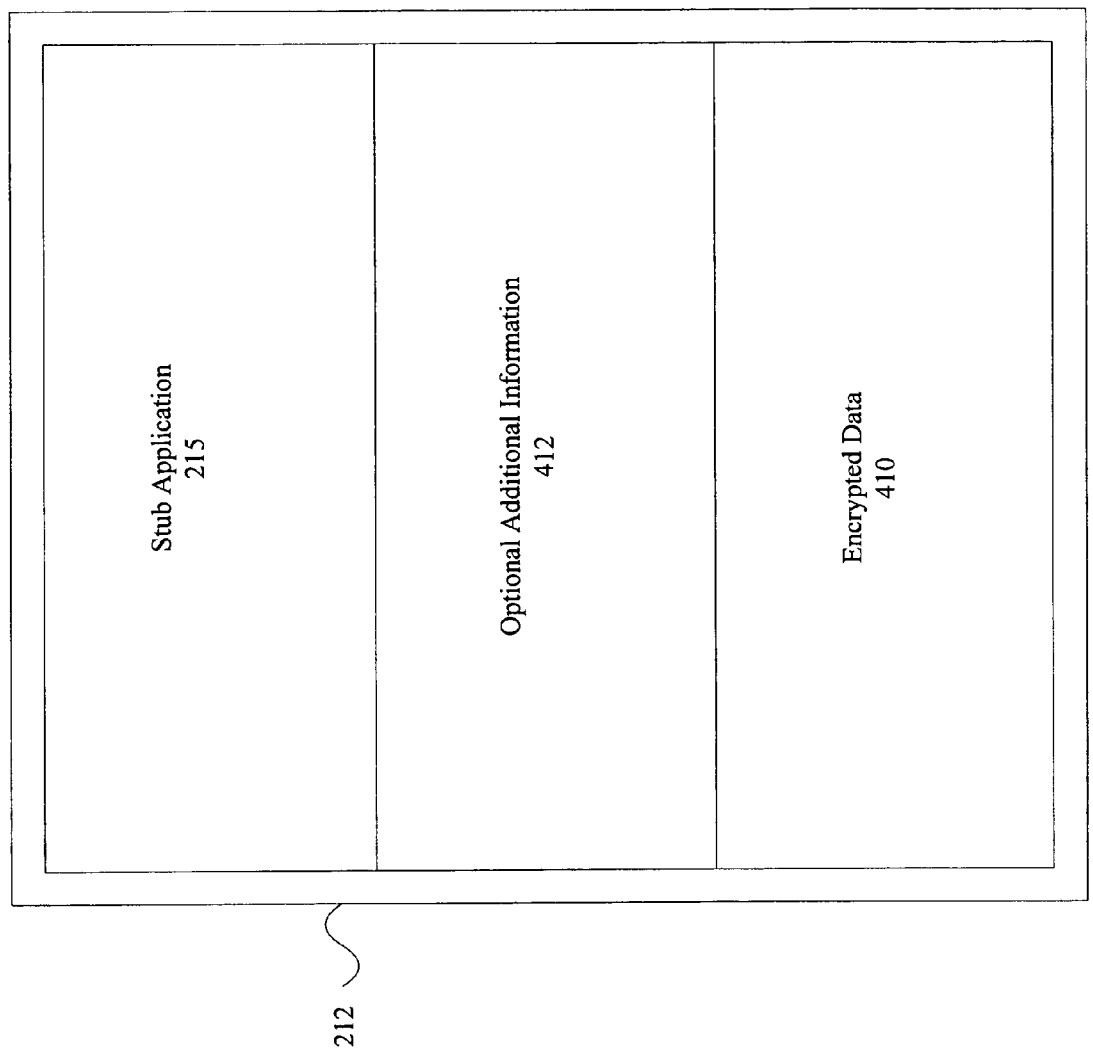

FIG. 4 shows a data package in accordance with one or more embodiments of the present invention. The data package (212) discussed with respect to FIG. 4 is just one of many different types of data packages that may be transmitted using the invention, between an originating computing system (102 of FIG. 1) and a receiving computing system (106 of FIG. 1) through a web service server (104 of FIG. 1). The data package (212) optionally includes encrypted data (410) and a stub application (215 of FIG. 2). Optionally, the data package (212) includes additional information (412) such as a portion of the encryption key to be used for encryption and decryption of the encrypted data (410) within data package (212). In one or more embodiments, a portion of the encryption key is alternatively embedded within the stub application, thus hiding the key from unauthorized persons. In one embodiment of the invention, the encryption module (306 of FIG. 3) generates an encryption key with valid authentication information entered by the receiving user and the portion of the encryption key in the additional information (412).

Figure 5A:
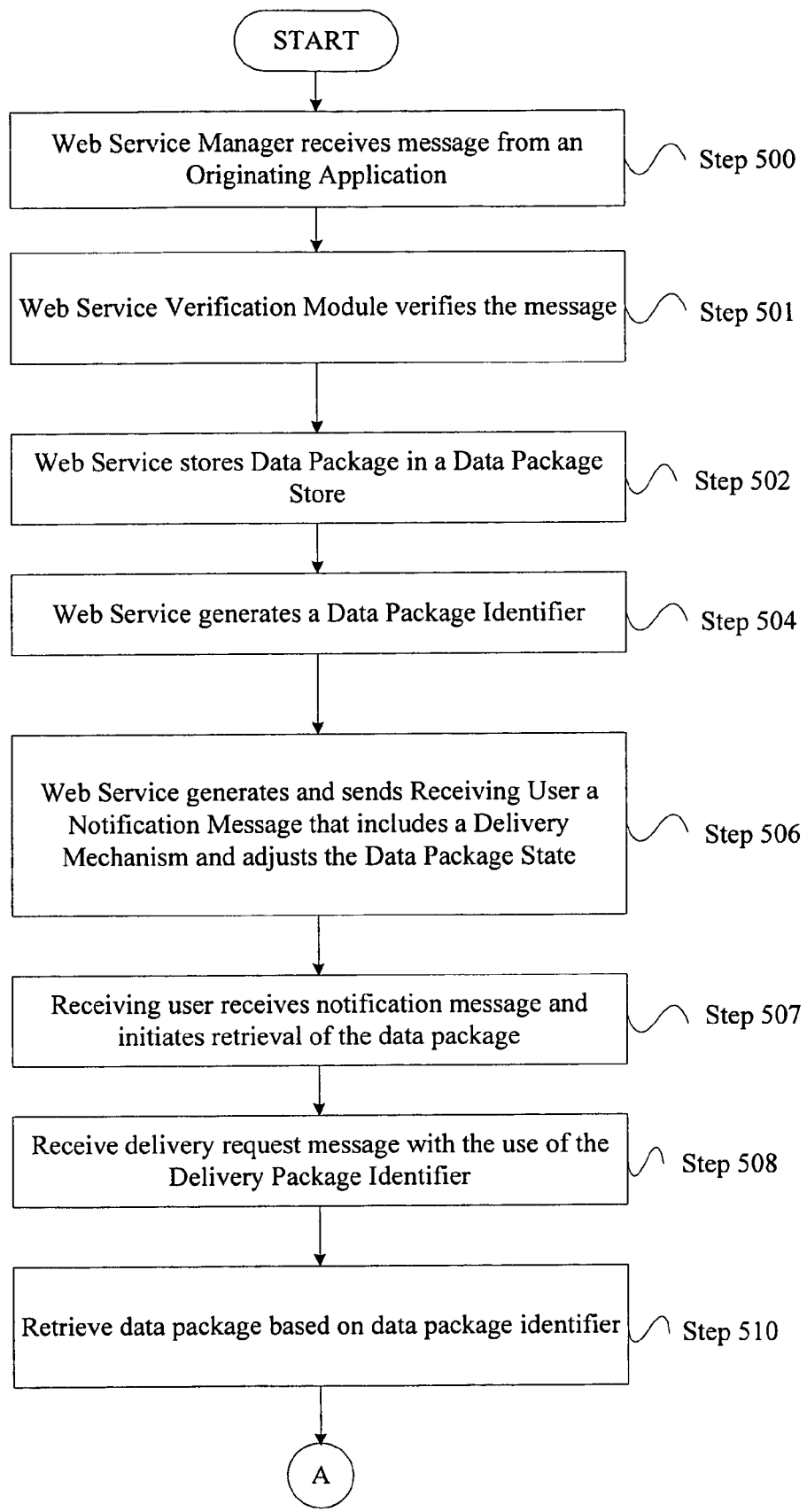
FIGS. 5A, 5B and 6 show flowcharts in accordance with one or more embodiments of the invention.
Figure 5B:
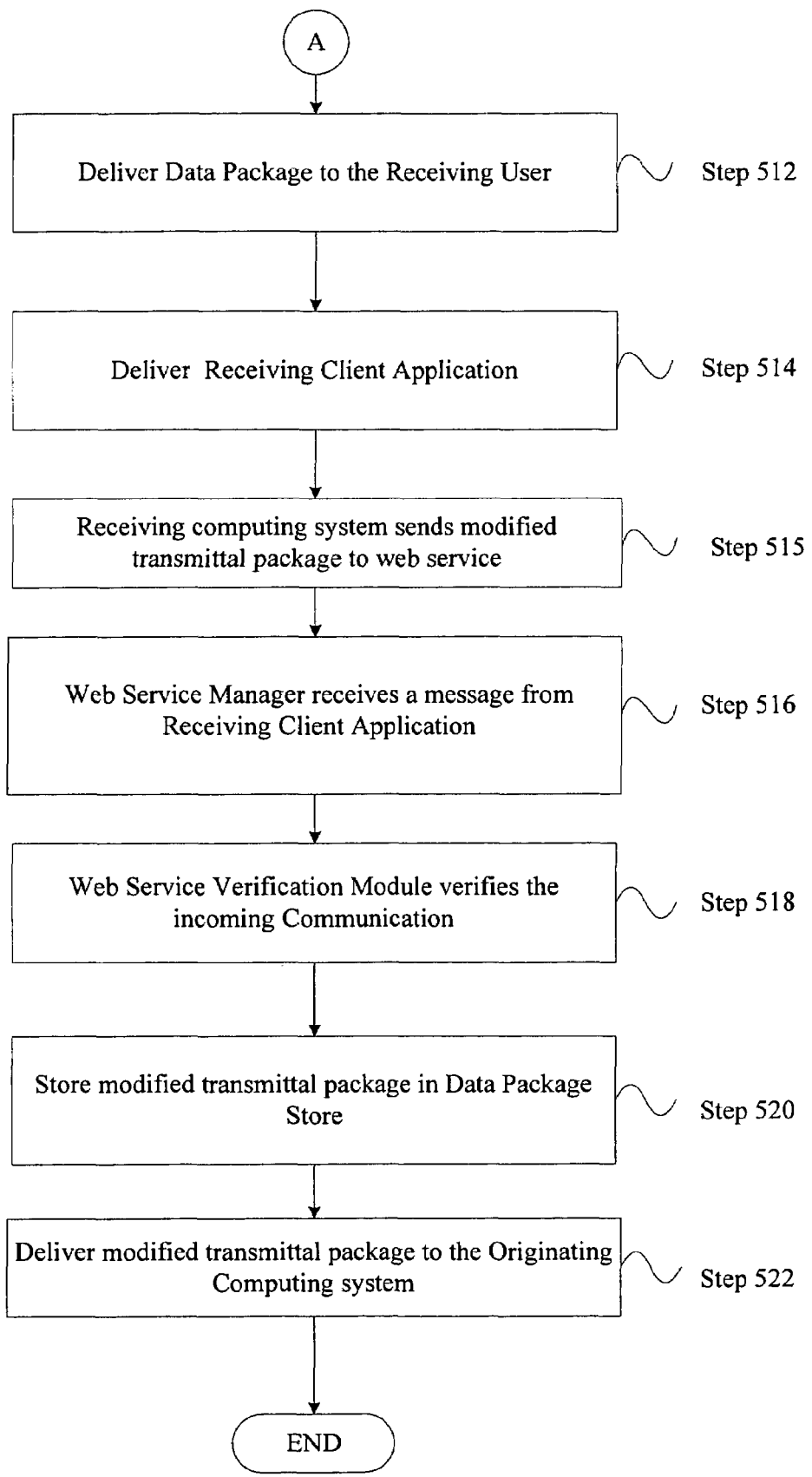

FIG. 5 shows a flowchart in accordance with one or more embodiments of the invention. The web service manager (204 of FIG. 2) receives an originating message from an originating client application (110 of FIG. 1) (Step 500). In one embodiment of the invention, the originating message includes a first attribute of an originating address (such as an email address, a peer to peer ID, etc) associated with an originating user, and a second attribute of a receiving address (such as an email address, a peer to peer ID, etc) associated with a receiving user.

Next, the web service manager (204 of FIG. 2) uses the verification module (205 of FIG. 2) to verify that the originating message came from an authorized originating client application (such as originating application 110 of FIG. 1) (Step 501). This verification may be made, for example, by comparing a digital signature sent by the originating client application with a list of authorized digital signatures.

Following verification, the web service manager (204 of FIG. 2) stores the data package (212 of FIG. 2) in the data package store (214 of FIG. 2) (Step 502).

The web service manager (204 of FIG. 2), at anytime following receipt of the transmitted package (410 of FIG. 4), generates a data package identifier with the identifier generator (208 of FIG. 2) (Step 504). As described above, the identifier generator uses, in one example, a hash function that takes as input a variable length string and produces a string of characters that is unique to the transmitted package (410). In one embodiment of the invention, the resulting hash is a fixed-length string.

In one embodiment of the invention, the input to the hash function is a transaction identifier, which is an identifier associated with the storage of the data package (212 of FIG. 2) (such as location information, etc.) in the data package store (214). Persons of ordinary skill in the art will recognize that possible inputs to the identifier generator (208) could take many forms, and can originate from many sources, while still remaining within the scope and purpose of the present invention.

After creation of the data package identifier, the web service (112 of FIG. 1) generates and sends a notification message to the receiving address (Step 506). In one embodiment, the notification message is an electronic communication that the web service sends to the receiving address provided in the received message in order to notify a person associated with that receiving address that a data package or other message is at the web service (112) awaiting delivery.

That notification message includes a retrieval mechanism which allows the recipient of the notification message to download the data package and the stub application. In one embodiment of the present invention, the retrieval mechanism is a URL with a query string that includes at least a portion of the data package identifier as a parameter. In one embodiment of the invention, a secure HTTP (HTTPS) request/response protocol is used with an obfuscated query string. Persons of ordinary skill in the art will recognize that the retrieval mechanism could take on many forms, such as an XML message having data which the data package store (214) uses to facilitate retrieval of the data package (212 of FIG. 2), as needed.

Once the notification message arrives (step 507), the recipient of that notification message can use the retrieval mechanism to initiate retrieval of the data package (212) as previously described. In one embodiment, the delivery request mechanism is a URL which, when activated (through the recipient clicking on it, for example, using a mouse) causes a delivery request message to be sent to the web service (104 of FIG. 1).

When the web service server (104) receives the delivery request message (Step 508), the web service server (104) uses the data package identifier within the delivery request message to retrieve at least a portion of the transmitted package (410 of FIG. 4) based upon the data package identifier (Step 510).

After retrieval of the data package (210) from the data package store (214), the web service manager (204 of FIG. 2) initiates transfer of a stub application (215 of FIG. 2) and the data package (212) to the receiving computing system (106 of FIG. 1) (Step 512). When the stub application (215 of FIG. 2) is executed, the stub application (215) initiates download of the receiving client application (210 of FIG. 2) from the web service server (104) to the receiving computing system (106 of FIG. 1)(Step 514).

At this point, a user of the receiving computing system (106) has the data package (212 of FIG. 2) and the receiving client application (210) enabling the encryption, decryption, editing and repackaging of data within the data package (212) as needed. If a user of the receiving computing system (106) makes one or more changes to the data and desires that the changes be propagated back to the originating computing system (102 of FIG. 1), further steps may be performed below to cause the data to be sent back to the originating computing system (102) as needed.

First, a user of receiving computing system (106) initiates the transmission (step 515), using either a web browser inquiry sent to the web service server (104) or using functionality provided within the receiving client application (210 of FIG. 2).

In one embodiment of the invention, the web service manager (204 of FIG. 2) receives a message from the receiving computing system (106) with at least a modified data package (not shown) (Step 516). The web service manager (204 of FIG. 2) verifies that the incoming message was received from an authorized source, using the verification module (205 of FIG. 2) (Step 518). Next, the web service manager (204 of FIG. 2) stores the modified data package for later delivery to the originating computing system (102) (Step 520), or delivers the modified data package without prior storage (Step 522).

In order for a user to be able to perform one or more of the aforementioned tasks, functionality is provided within either of the stub application (215 of FIG. 2) or the receiving client application (210 of FIG. 2).

Figure 6:
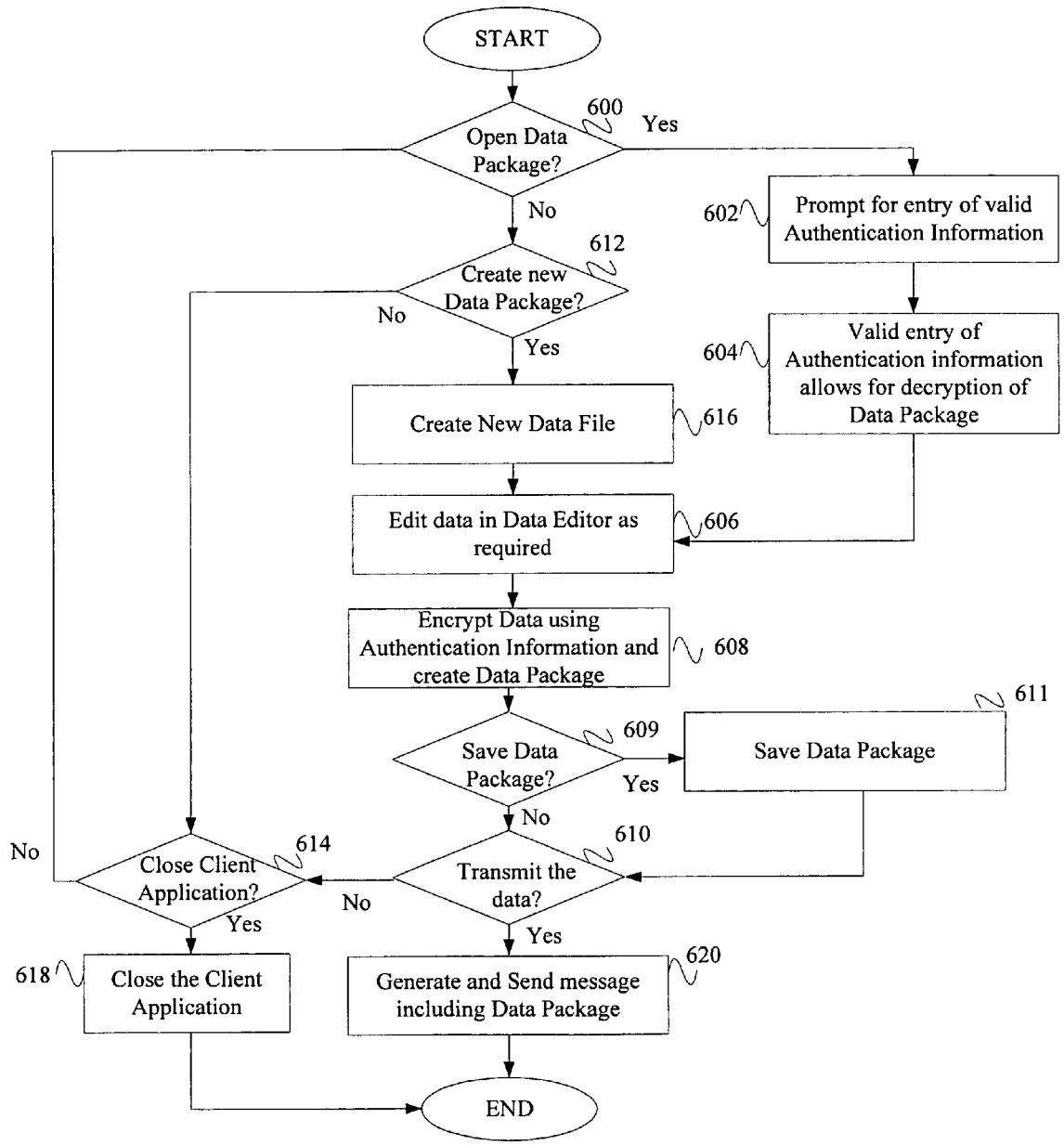

FIG. 6 is a flowchart for one or more processes that might be performed by a stub application (215 of FIG. 2) or a receiving client application (215 of FIG. 2) that is used by an originating user of the web service. Although the discussion of FIG. 6 describes the data transmission from the view point of a originating user, persons of ordinary skill in the art will recognize that a receiving user that receives a user data package from another user may follow the same steps to retransmit the data to other users with the web service and thus be designated an originating user with respect to retransmission of the data package.

An originating user decides whether to open an existing data package (Step 600). If the user elects to open an existing data package (212), the user is prompted for entry of authentication information (Step 602). In one embodiment of the invention, authentication information includes a portion of an encryption key or password, known by the user who created the data package at the originating client computing system (102 of FIG. 1), and includes at least a portion of the encryption key or password generated by the encryption module (306 of FIG. 3) to allow for decryption of one or more portions of the data package.

Upon valid entry of authentication information, the encryption module decrypts the encrypted portion of the data package using the encryption module (Step 604). Next, in one embodiment, the user edits the data in a data editor, as desired (Step 606). After completion of editing the data, the user initiates encryption of the edited data package using the authentication information, and thus creates a modified data package suitable for transmission (Step 608). Next, the user must decide whether to save the data package (Step 609). If the user decides to save the data package, the data package is saved, to the user's computing system, or elsewhere, as desired (Step 611). Further, the user must decide whether to transmit the data package (Step 610). If the user decides not to save the data package, then the user must decide whether to transmit the data package (Step 610).

If the user chooses not to transmit the data package, the user can choose either to close or not to close the client application (Step 614). If the user chooses not to close the client application, then the user again can decide whether to open an existing data package (Step 600) as described above.

If the user decides to close the client application (Step 614), then the client application closes (Step 618), and the method ends.

Again, at Step 610, if the user elects to transmit the data, the client application generates and sends an originating message to the web service server ((104 of FIG. 1) that includes the modified data package (Step 620). In one embodiment, with the case of a retransmission of a data package, the originating message that enables the retransmission may include the data package identifier to indicate to the web service manager that this is data being retransmitted back to a particular originating user.

If the user decides not to open an existing data package (Step 600), the user may decide whether to create a new data package (Step 612). If the user decides not to create a new data package (Step 612), then the user may close the client application (Step 614) as discussed previously. Alternatively, if the user decides to create a new data package, the client application creates a new data package suitable for editing with the user data editor (Step 616). The user is able to continue using the client application from Step 606 as described above.

Advantages seen when practicing this invention may include the transmission of one or more data packages with a client application to a user, without using electronic mail to transmit one or more executable files.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An intermediary computing system for transmitting a data package from an originating computing system to a receiving computing system comprising:

a data store for storing the data package at a storage location;

an identifier generator, executing on a processor, for creating a data package identifier associated with the storage location;

a message generator, executing on the processor, for generating a notification message to be sent to the receiving computing system of a receiving user, wherein the notification message comprises at least a portion of the data package identifier; and a web service manager, executing on the processor, for:

receiving an originating message from an originating client application executing on the originating computing system, wherein the originating message comprises the data package and verification information, wherein the data package comprises an encrypted portion;

verifying that the originating message originated from an authorized originating client application using the verification information;

storing the data package in the data store;

retrieving, upon receipt of at least a portion of the notification message from the receiving computing system, the data package from the data store using the data package identifier; and initiating a transfer of the data package and a stub application to the receiving computing system, wherein the stub application is configured to obtain a client application for providing the receiving user with access to the encrypted portion of the data package.

2. The intermediary computing system of claim 1, wherein the client application comprises functionality to decrypt the encrypted portion of the data package, upon receipt of valid authentication information.

3. The intermediary computing system of claim 1, wherein the verification information comprises at least one selected from the group consisting of a digital signature and a client identifier.

4. The intermediary computing system of claim 1, further comprising a data package state associated with the data package, wherein the data package state comprises information relating to whether the data package has previously been transferred to the receiving computing system.

5. The intermediary computing system of claim 1, wherein the data package further comprises at least a portion of an encryption key used to encrypt the encrypted portion of the data package.

6. The intermediary computing system of claim 1, wherein the originating message further comprises:
 a receiving address associated with the receiving user, wherein the receiving user is a user of the receiving computing system.

7. The intermediary computing system of claim 1, wherein the client application further comprises:
 a client application manager for managing decryption of the encrypted portion of the data package using an encryption module, wherein the encryption module generates an encryption key for the decryption of the encrypted portion of the data package; and
 a data editor comprising functionality for modifying at least a portion of the data package.

8. The intermediary computing system of claim 7, wherein the encryption key is generated using a portion of the authentication information.

9. The intermediary computing system of claim 7, wherein the client application further comprises:
 a message generator for generating a second originating message, wherein the web service manager services the second originating message received from the receiving computing system by delivering the data package to the originating computing system.

10. The intermediary computing system of claim 1, wherein at least a portion of the data package comprises tax preparation data.

11. The intermediary computing system of claim 1, wherein the identifier generator comprises a hash function to create the data package identifier.

12. The intermediary computing system of claim 1, wherein the data store is a relational database.

13. A method for managing the transmission of a data package from an originating computing system to a receiving computing system comprising:
 receiving, by an intermediary computing system, an originating message from an originating client application executing on the originating computing system, wherein the originating message comprises a data package and a verification information, wherein the data package comprises an encrypted portion;
 verifying the originating message as originating from an authorized originating client application using the verification information;
 extracting a data package from the originating message, wherein a first portion of the data package is encrypted;
 storing the data package in a data store;
 generating a data package identifier associated with a location within the data store where the data package is stored;
 generating a notification message comprising at least a portion of the data package identifier;
 sending the notification message to a receiving address associated with a receiving user;
 receiving a first request from the receiving computing system, the first request comprising at least a portion of the notification message;
 retrieving the data package from the data store using the portion of the data package identifier; and
 initiating transfer of the data package and a stub application to the receiving computing system, operated by a receiving user, wherein the stub application facilitates the transfer of a client application which provides access to the encrypted portion of the data package.

14. The method of claim 13, wherein verifying the originating message as originating from an authorized originating application using the verification information further comprises
 matching at least a portion of the verification information with at least one portion of information designating at least one authorized originating application.

15. The method of claim 13, wherein the data package identifier is a hash value representative of the location of the data package.

16. A method for managing the transmission of a data package from an originating computing system to a receiving computing system comprising:
 receiving, by the receiving computing system, a first message from a web service manager executing on an intermediary computing system, wherein the first message comprises a Uniform Resource Locator;
 transmitting a second message to the web service manager, the second message comprising at least a first portion of the Uniform Resource Locator, and wherein the first portion of the Uniform Resource Locator is obfuscated;
 receiving a stub application and a data package comprising an encrypted portion from the intermediary computing system, wherein the data package is received by the intermediary computing system from the originating computing system, wherein the stub application facilitates the transfer of a client application which provides access to the encrypted portion of the data package; and
 decrypting the encrypted portion of the data package using the client application, responsive to receiving valid authentication information.

17. The method of claim 16, wherein the portion of the Uniform Resource Locator comprises a hash representative of a location of the data package within the web service manager.

18. The method of claim 16, further comprising:
 receiving user input requesting at least one from the group consisting of editing of the data package, retransmission of the data package, reencryption of at least a portion of the data package.

19. The method of claim 18, wherein the receiving client application retransmits at least a portion of the data package by sending a third message to the web service manager.

* * * * *